United States Patent
Park et al.

(10) Patent No.: US 9,936,527 B2
(45) Date of Patent: Apr. 3, 2018

(54) METHOD AND APPARATUS FOR CONFIGURING CELL IN WIRELESS COMMUNICATION SYSTEM

(71) Applicant: LG Electronics Inc., Seoul (KR)

(72) Inventors: Sungjun Park, Seoul (KR); Youngdae Lee, Seoul (KR); Seungjune Yi, Seoul (KR); Sunghoon Jung, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 93 days.

(21) Appl. No.: 14/650,750

(22) PCT Filed: Jan. 15, 2014

(86) PCT No.: PCT/KR2014/000429
§ 371 (c)(1),
(2) Date: Jun. 9, 2015

(87) PCT Pub. No.: WO2014/112783
PCT Pub. Date: Jul. 24, 2014

(65) Prior Publication Data
US 2015/0312947 A1   Oct. 29, 2015

Related U.S. Application Data

(60) Provisional application No. 61/753,388, filed on Jan. 16, 2013.

(51) Int. Cl.
*H04W 72/04* (2009.01)
*H04W 76/04* (2009.01)
(Continued)

(52) U.S. Cl.
CPC ........... *H04W 76/02* (2013.01); *H04L 5/0098* (2013.01); *H04M 1/725* (2013.01);
(Continued)

(58) Field of Classification Search
CPC .... H04L 5/001; H04L 5/0098; H04W 76/046; H04W 72/0426; H04W 52/365
See application file for complete search history.

(56) References Cited

U.S. PATENT DOCUMENTS

| | | | |
|---|---|---|---|
| 2011/0134774 A1* | 6/2011 | Pelletier | H04W 52/365 370/252 |
| 2013/0155905 A1* | 6/2013 | Sampath | H04W 48/16 370/255 |

FOREIGN PATENT DOCUMENTS

| | | |
|---|---|---|
| WO | 2012023839 | 2/2012 |
| WO | 2012137074 | 10/2012 |

OTHER PUBLICATIONS

Mediatek Inc., "Discussion on SCell activation/deactivation," R2-125429, 3GPP TSG-RAN2 #80 Meeting, New Orleans, USA. Nov. 12-16, 2012, see pp. 1-5.
(Continued)

*Primary Examiner* — Ayaz Sheikh
*Assistant Examiner* — Debebe Asefa
(74) *Attorney, Agent, or Firm* — Dentons US LLP

(57) ABSTRACT

A method and apparatus for configuring a cell in a wireless communication system is provided. A user equipment (UE) receives a radio resource control (RRC) message which includes a configuration for a secondary cell (SCell) and an indication of an initial state of the SCell. The initial state of the SCell is set to either one of an activated state and deactivated state. The UE configures the SCell based on the configuration and the initial state of the SCell.

8 Claims, 19 Drawing Sheets

(51) Int. Cl.
    *H04W 88/08*     (2009.01)
    *H04W 88/16*     (2009.01)
    *H04W 76/02*     (2009.01)
    *H04L 5/00*     (2006.01)
    *H04M 1/725*     (2006.01)

(52) U.S. Cl.
    CPC ........ *H04W 72/042* (2013.01); *H04W 76/046* (2013.01); *H04W 88/08* (2013.01); *H04W 88/16* (2013.01)

(56) References Cited

OTHER PUBLICATIONS

ZTE, "Discussion on activation and deactivation MAC CE," R2-106330, 3GPP TSG RAN WG2 Meeting #72, Jacksonville, USA. Nov. 15-19, 2010, see pp. 1-4; and fig. 2.1
3GPP TS 36,331 V11.2.0, "3GPP; TSGRAN; E-UTRA; RRC; Protocol specification (Release 11)," Dec. 2012, see pp. 49, 50, 64, 203, 215; and fig. 5.3.5.1-1.

* cited by examiner

FIG. 13
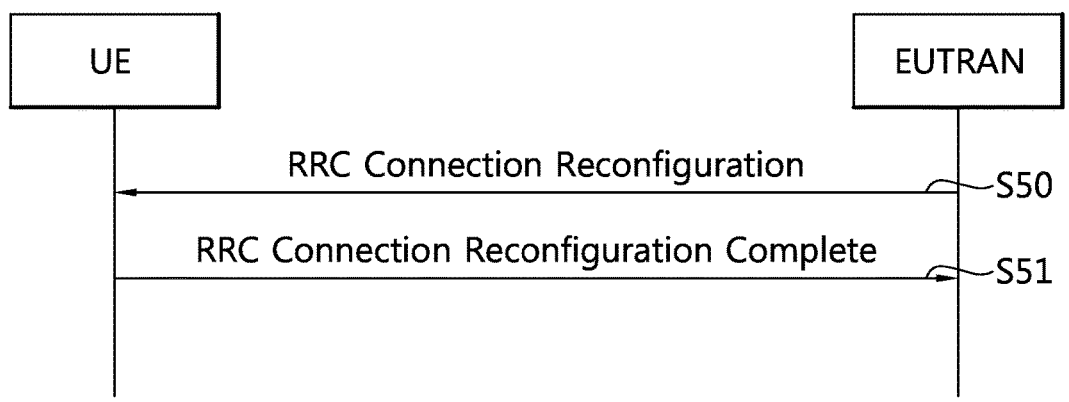
(a)
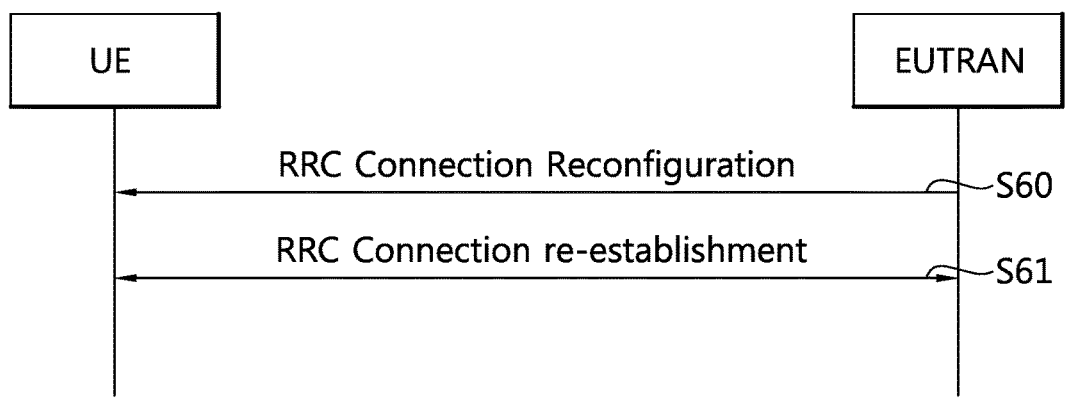
(b)

METHOD AND APPARATUS FOR CONFIGURING CELL IN WIRELESS COMMUNICATION SYSTEM

This application is a 35 USC § 371 National Stage entry of International Application No. PCT/KR2014/000429 filed on Jan. 15, 2014, and claims priority to U.S. Provisional Application No. 61/753,388 filed on Jan. 16, 2013, all of which are hereby incorporated by reference in their entireties as if fully set forth herein.

BACKGROUND OF THE INVENTION

Field of the Invention

The present invention relates to wireless communications, and more specifically, to a method and apparatus for configuring a cell in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Carrier aggregation (CA) may be introduced. In CA, two or more component carriers (CCs) are aggregated in order to support wider transmission bandwidths up to 100 MHz. A UE may simultaneously receive or transmit on one or multiple CCs depending on its capabilities. A Rel-10 UE with reception and/or transmission capabilities for CA can simultaneously receive and/or transmit on multiple CCs corresponding to multiple serving cells. A Rel-8/9 UE can receive on a single CC and transmit on a single CC corresponding to one serving cell only.

A cell is combination of downlink resources and optionally uplink resources. The linking between the carrier frequency of the downlink resources and the carrier frequency of the uplink resources is indicated in the system information transmitted on the downlink resources. A serving cell may consist of one DL CC and one UL CC. Or, a serving cell may consist of one DL CC only.

There may be a plurality of serving cells, and the plurality of serving cells consists may consist of one primary cell (PCell) and at least one secondary cell (SCell). A method for configuring a SCell efficiently may be required.

SUMMARY OF THE INVENTION

The present invention provides a method and apparatus for configuring a cell in a wireless communication system. The present invention provides a method for indicating an initial state of a secondary cell (SCell). The present invention provides a method for configuring a SCell based on an initial state of the SCell.

In an aspect, a method for configuring, by a user equipment (UE), a cell in a wireless communication system is provided. The method includes receiving a radio resource control (RRC) message which includes a configuration for a secondary cell (SCell) and an indication of an initial state of the SCell, and configuring the SCell based on the configuration and the initial state of the SCell. The initial state of the SCell is set to either one of an activated state and deactivated state.

The method may further include transmitting or receiving data on the SCell without an additional activation command if the initial state of the SCell is set to the activated state.

The method may further include receiving an activation command for the SCell if the initial state of the SCell is set to the deactivated state.

The method may further include activating the SCell according to the activation command, and transmitting or receiving data on the SCell.

The indication may be received via an RRC connection reconfiguration message.

The indication may be defined per UE or per cell.

In another aspect, a user equipment (UE) in a wireless communication system is provided. The UE includes a radio frequency (RF) unit for transmitting or receiving a radio signal, and a processor coupled to the RF unit, and configured to receive a radio resource control (RRC) message which includes a configuration for a secondary cell (SCell) and an indication of an initial state of the SCell, and configure the SCell based on the configuration and the initial state of the SCell. The initial state of the SCell is set to either one of an activated state and deactivated state.

An initial state of a SCell can be activated when the SCell is added, and accordingly, data transmission through the SCell can be available without additional an activation procedure.

BRIEF DESCRIPTION OF THE DRAWINGS

FIG. 13 shows an RRC connection reconfiguration procedure.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
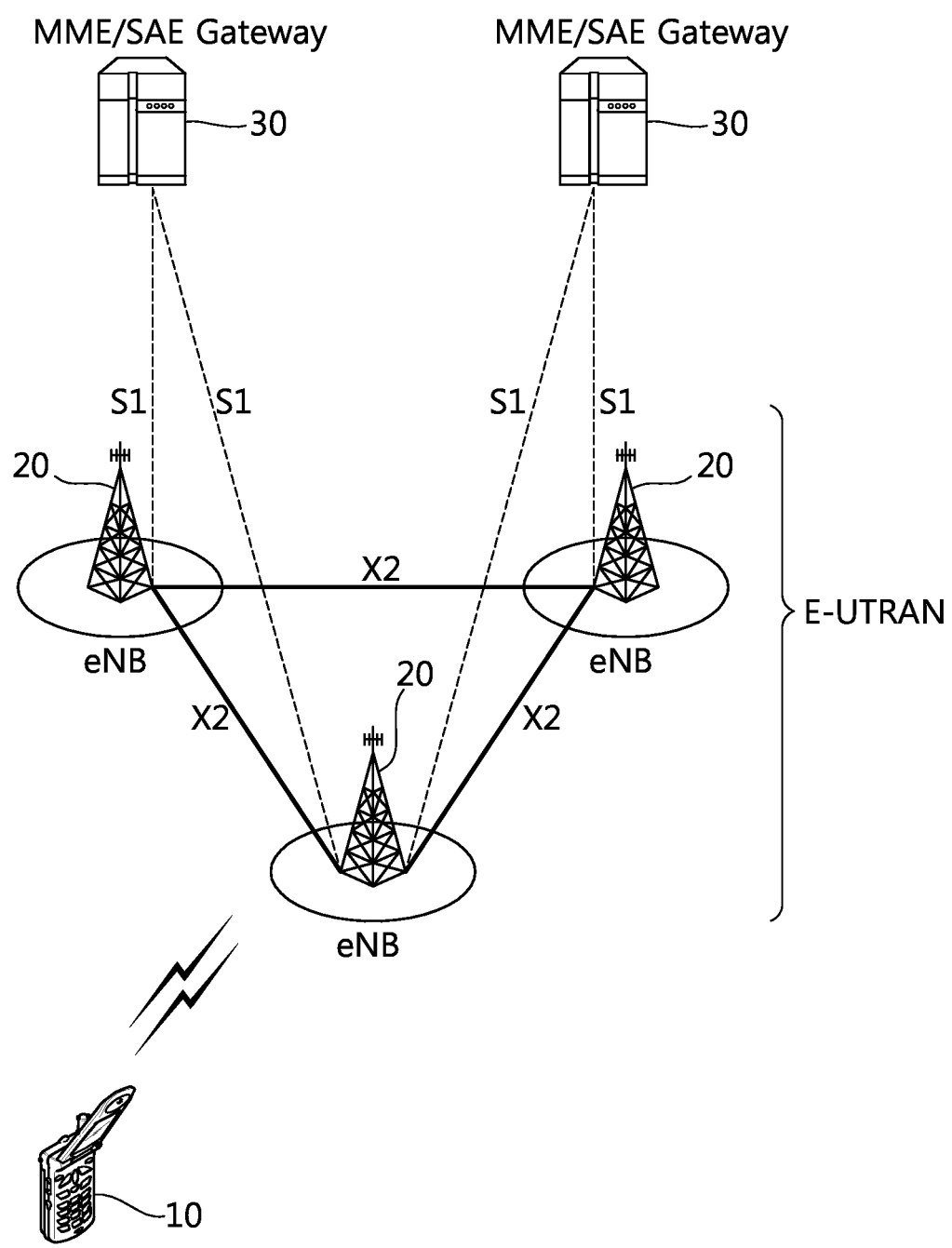
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
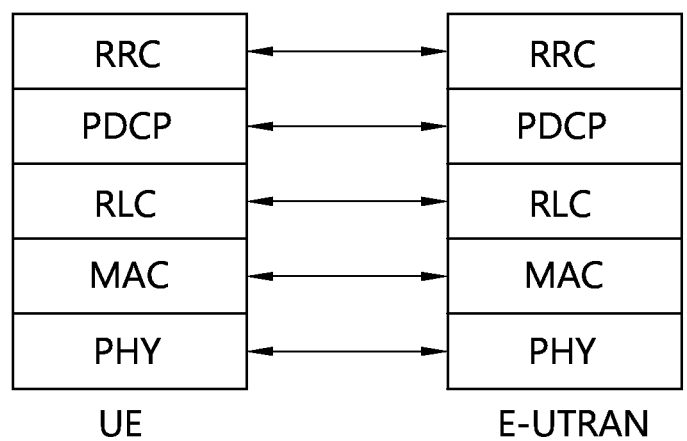
FIG. 2 shows a control plane of a radio interface protocol of an LTE system.
Figure 3:
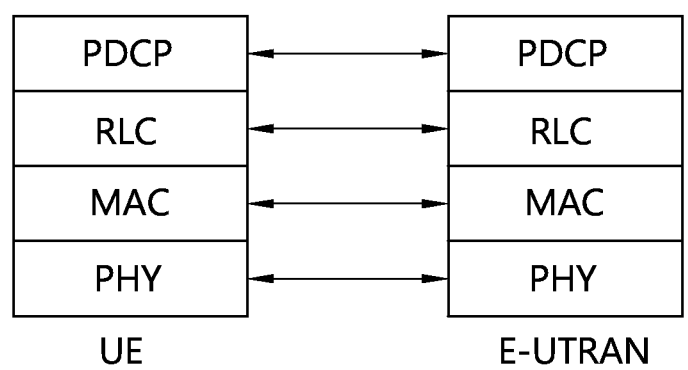
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
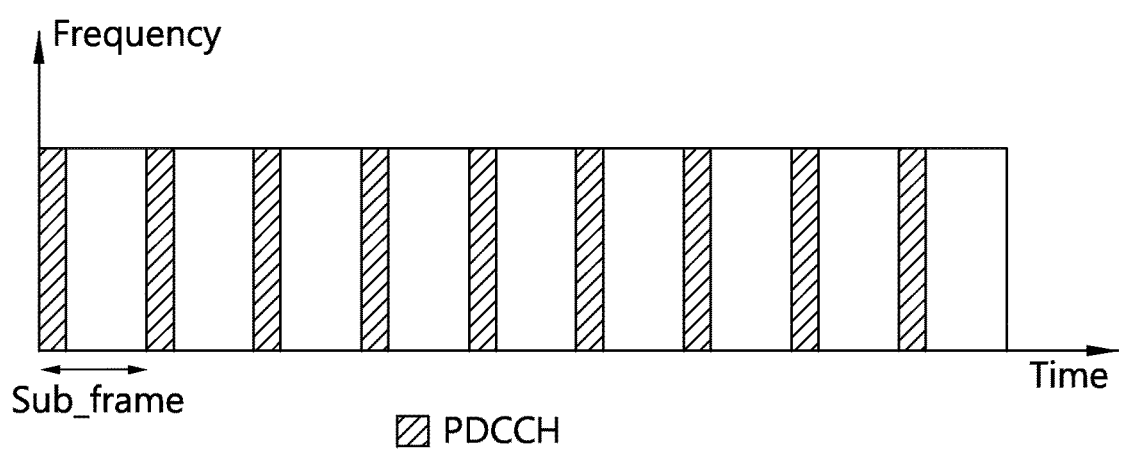
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

It is known that different cause values may be mapped to the signature sequence used to transmit messages between a UE and eNB and that either channel quality indicator (CQI)

or path loss and cause or message size are candidates for inclusion in the initial preamble.

When a UE wishes to access the network and determines a message to be transmitted, the message may be linked to a purpose and a cause value may be determined. The size of the ideal message may be also be determined by identifying all optional information and different alternative sizes, such as by removing optional information, or an alternative scheduling request message may be used.

The UE acquires necessary information for the transmission of the preamble, UL interference, pilot transmit power and required signal-to-noise ratio (SNR) for the preamble detection at the receiver or combinations thereof. This information must allow the calculation of the initial transmit power of the preamble. It is beneficial to transmit the UL message in the vicinity of the preamble from a frequency point of view in order to ensure that the same channel is used for the transmission of the message.

The UE should take into account the UL interference and the UL path loss in order to ensure that the network receives the preamble with a minimum SNR. The UL interference can be determined only in the eNB, and therefore, must be broadcast by the eNB and received by the UE prior to the transmission of the preamble. The UL path loss can be considered to be similar to the DL path loss and can be estimated by the UE from the received RX signal strength when the transmit power of some pilot sequence of the cell is known to the UE.

The required UL SNR for the detection of the preamble would typically depend on the eNB configuration, such as a number of Rx antennas and receiver performance. There may be advantages to transmit the rather static transmit power of the pilot and the necessary UL SNR separately from the varying UL interference and possibly the power offset required between the preamble and the message.

The initial transmission power of the preamble can be roughly calculated according to the following formula:

Transmit power=TransmitPilot−RxPilot+ULInterference+Offset+SNRRequired

Therefore, any combination of SNRRequired, ULInterference, TransmitPilot and Offset can be broadcast. In principle, only one value must be broadcast. This is essentially in current UMTS systems, although the UL interference in 3GPP LTE will mainly be neighboring cell interference that is probably more constant than in UMTS system.

The UE determines the initial UL transit power for the transmission of the preamble as explained above. The receiver in the eNB is able to estimate the absolute received power as well as the relative received power compared to the interference in the cell. The eNB will consider a preamble detected if the received signal power compared to the interference is above an eNB known threshold.

The UE performs power ramping in order to ensure that a UE can be detected even if the initially estimated transmission power of the preamble is not adequate. Another preamble will most likely be transmitted if no ACK or NACK is received by the UE before the next random access attempt. The transmit power of the preamble can be increased, and/or the preamble can be transmitted on a different UL frequency in order to increase the probability of detection. Therefore, the actual transmit power of the preamble that will be detected does not necessarily correspond to the initial transmit power of the preamble as initially calculated by the UE.

The UE must determine the possible UL transport format. The transport format, which may include MCS and a number of resource blocks that should be used by the UE, depends mainly on two parameters, specifically the SNR at the eNB and the required size of the message to be transmitted.

In practice, a maximum UE message size, or payload, and a required minimum SNR correspond to each transport format. In UMTS, the UE determines before the transmission of the preamble whether a transport format can be chosen for the transmission according to the estimated initial preamble transmit power, the required offset between preamble and the transport block, the maximum allowed or available UE transmit power, a fixed offset and additional margin. The preamble in UMTS need not contain any information regarding the transport format selected by the EU since the network does not need to reserve time and frequency resources and, therefore, the transport format is indicated together with the transmitted message.

The eNB must be aware of the size of the message that the UE intends to transmit and the SNR achievable by the UE in order to select the correct transport format upon reception of the preamble and then reserve the necessary time and frequency resources. Therefore, the eNB cannot estimate the SNR achievable by the EU according to the received preamble because the UE transmit power compared to the maximum allowed or possible UE transmit power is not known to the eNB, given that the UE will most likely consider the measured path loss in the DL or some equivalent measure for the determination of the initial preamble transmission power.

The eNB could calculate a difference between the path loss estimated in the DL compared and the path loss of the UL. However, this calculation is not possible if power ramping is used and the UE transmit power for the preamble does not correspond to the initially calculated UE transmit power. Furthermore, the precision of the actual UE transmit power and the transmit power at which the UE is intended to transmit is very low. Therefore, it has been proposed to code the path loss or CQI estimation of the downlink and the message size or the cause value In the UL in the signature.

Carrier aggregation (CA) is described. It may be referred to Section 5.5 of 3GPP TS 36.300 V11.4.0 (December 2012).

Figure 5:
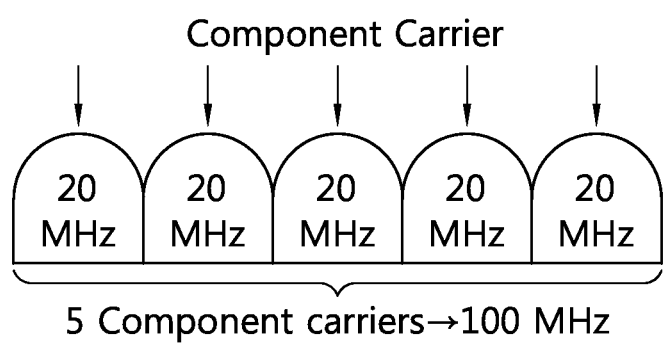
FIG. 5 shows an example of a carrier aggregation of 3GPP LTE-A.

FIG. 5 shows an example of a carrier aggregation of 3GPP LTE-A. Referring to FIG. 5, each component carrier (CC) has a bandwidth of 20 MHz, which is a bandwidth of 3GPP LTE. Up to 5 CCs may be aggregated, so maximum bandwidth of 100 MHz may be configured.

When the CA is configured, the UE only has one RRC connection with the network. At RRC connection establishment/re-establishment, one serving cell provides the security input (one E-UTRAN cell global identifier (ECGI), one physical cell identifier (PCI) and one absolute radio-frequency channel number (ARFCN)) and the NAS mobility information (e.g., tracking area identity (TAI)) similarly as in Rel-8/9. This cell is referred to as the PCell. In the downlink, the carrier corresponding to the primary serving cell (PCell) is the downlink primary component carrier (DL PCC) while in the uplink it is the uplink primary component carrier (UL PCC).

Depending on UE capabilities, secondary serving cells (SCells) can be configured to form together with the PCell a set of serving cells. In the downlink, the carrier corresponding to a SCell is a downlink secondary component carrier (DL SCC) while in the uplink it is an uplink secondary component carrier (UL SCC).

The configured set of serving cells for a UE therefore always consists of one PCell and one or more SCells:

- For each SCell the usage of uplink resources by the UE in addition to the downlink ones is configurable (the number of DL SCCs configured is therefore always larger or equal to the number of UL SCCs and no SCell can be configured for usage of uplink resources only);
- The number of serving cells that can be configured depends on the aggregation capability of the UE;
- PCell can only be changed with handover procedure (i.e., with security key change and RACH procedure);
- PCell is used for transmission of PUCCH;
- PCell is used for random access procedure;
- Unlike SCells, PCell cannot be de-activated;
- Re-establishment is triggered when PCell experiences radio link failure (RLF), not when SCells experience RLF;
- NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signaling is used for sending the system information of the SCell required for transmission/reception (similarly as in Rel-8/9 for handover).

Figure 6:
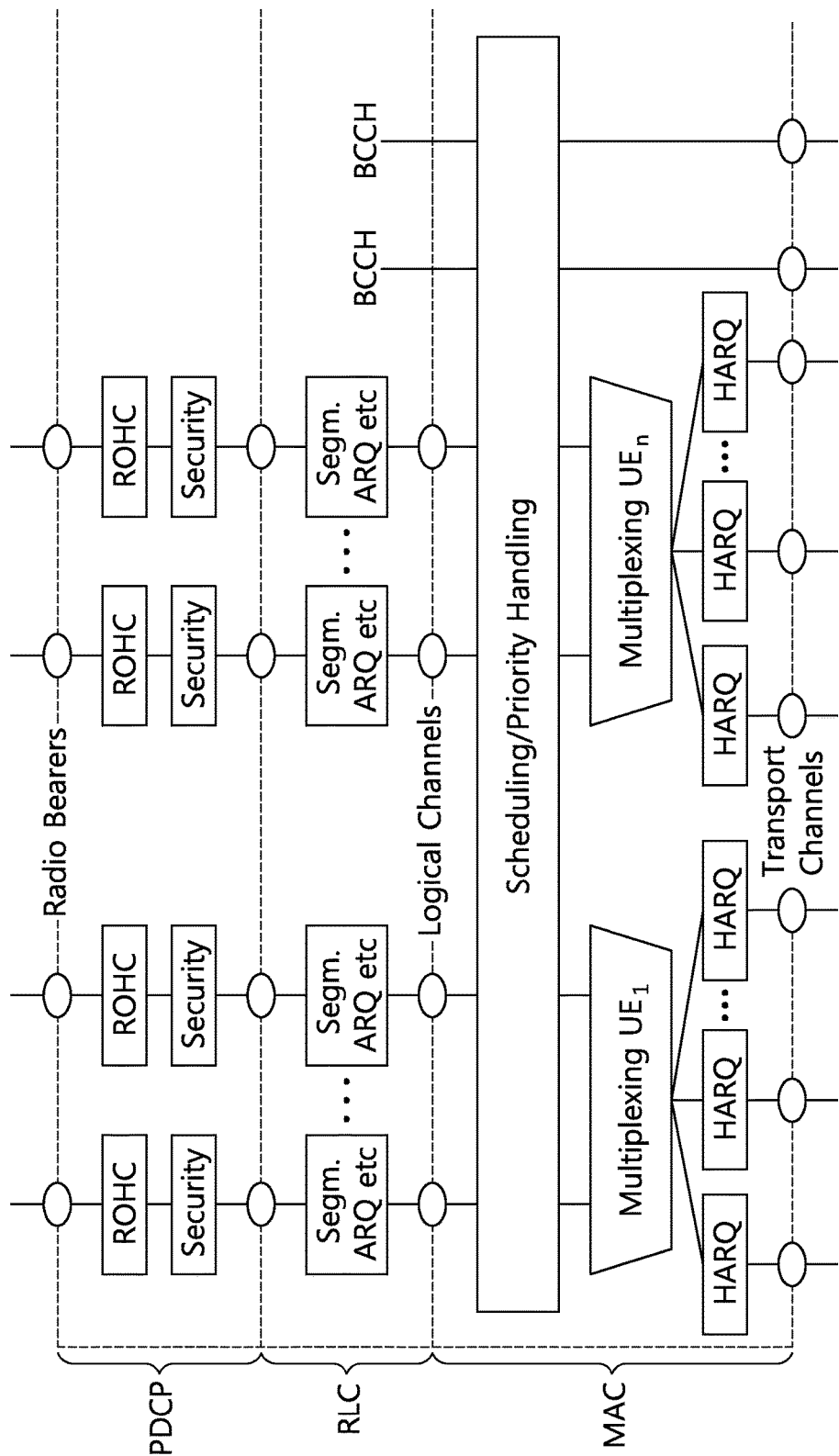
FIG. 6 shows an example of a structure of DL layer 2 when carrier aggregation is used.
Figure 7:
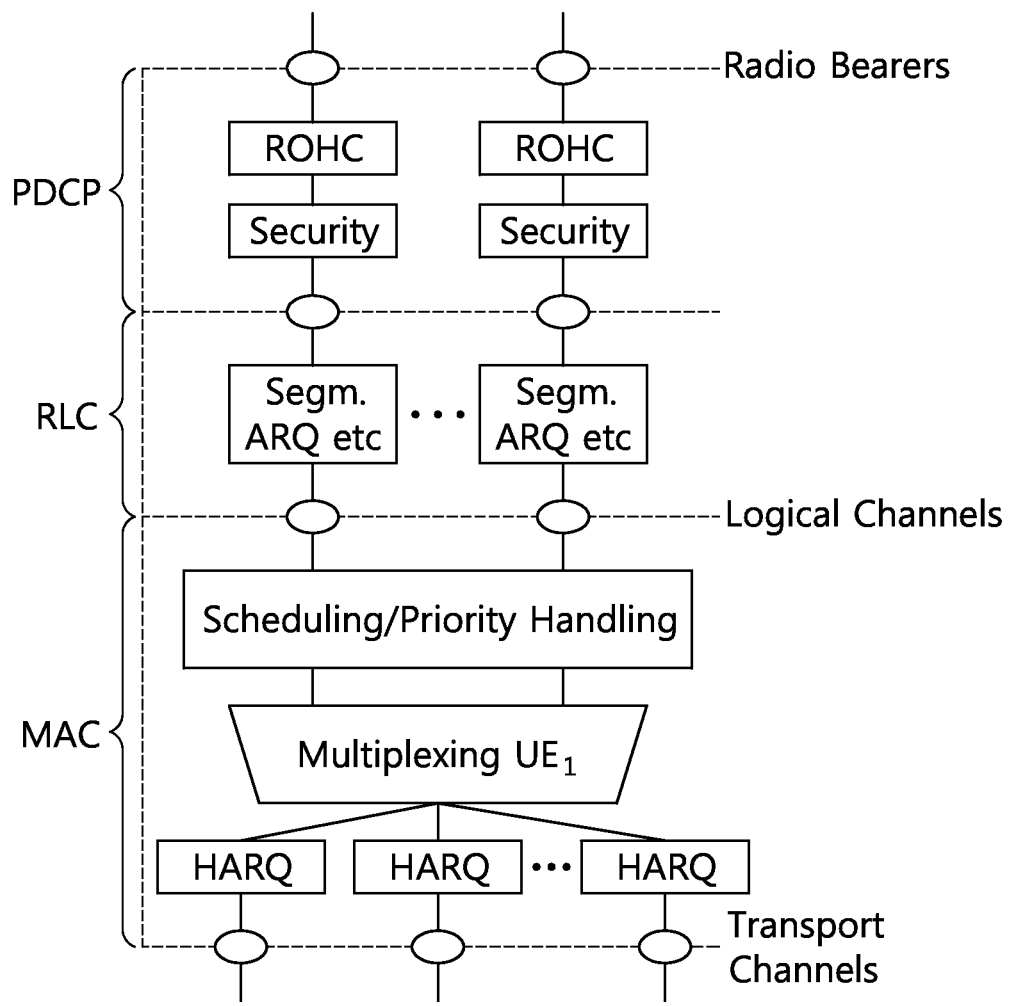
FIG. 7 shows an example of a structure of UL layer 2 when carrier aggregation is used.

FIG. 6 shows an example of a structure of DL layer 2 when carrier aggregation is used. FIG. 7 shows an example of a structure of UL layer 2 when carrier aggregation is used. The carrier aggregation may affect a MAC layer of the L2. For example, since the carrier aggregation uses a plurality of CCs, and each hybrid automatic repeat request (HARQ) entity manages each CC, the MAC layer of 3GPP LTE-A using the CA shall perform operations related to a plurality of HARQ entities. Further, each HARQ entity processes a transport block independently. Therefore, when the CA is used, a plurality of transport blocks may be transmitted or received at the same time through a plurality of CCs.

In Rel-10, for the uplink, the focus is laid on the support of intra-band carrier aggregations. For the downlink, all scenarios should be supported in Rel-10.

Figure 8:
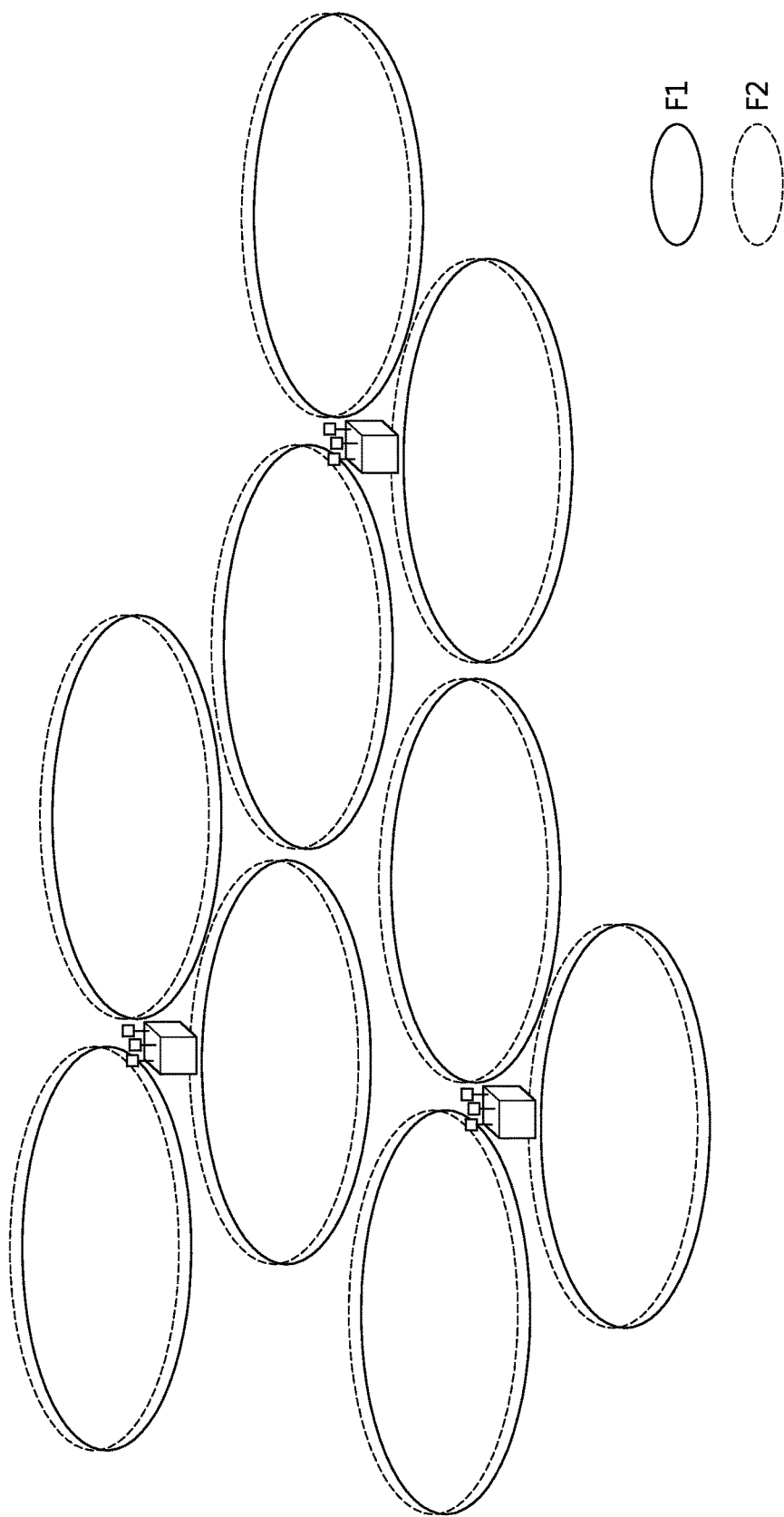
FIG. 8 shows an example of a potential deployment scenario for CA.

FIG. 8 shows an example of a potential deployment scenario for CA. Referring to FIG. 8, F1 and F2 cells are co-located and overlaid, providing nearly the same coverage. Both layers provide sufficient coverage and mobility can be supported on both layers. Likely scenario is when F1 and F2 are of the same band, e.g., 2 GHz, 800 MHz, etc. It is expected that aggregation is possible between overlaid F1 and F2 cells.

Figure 9:
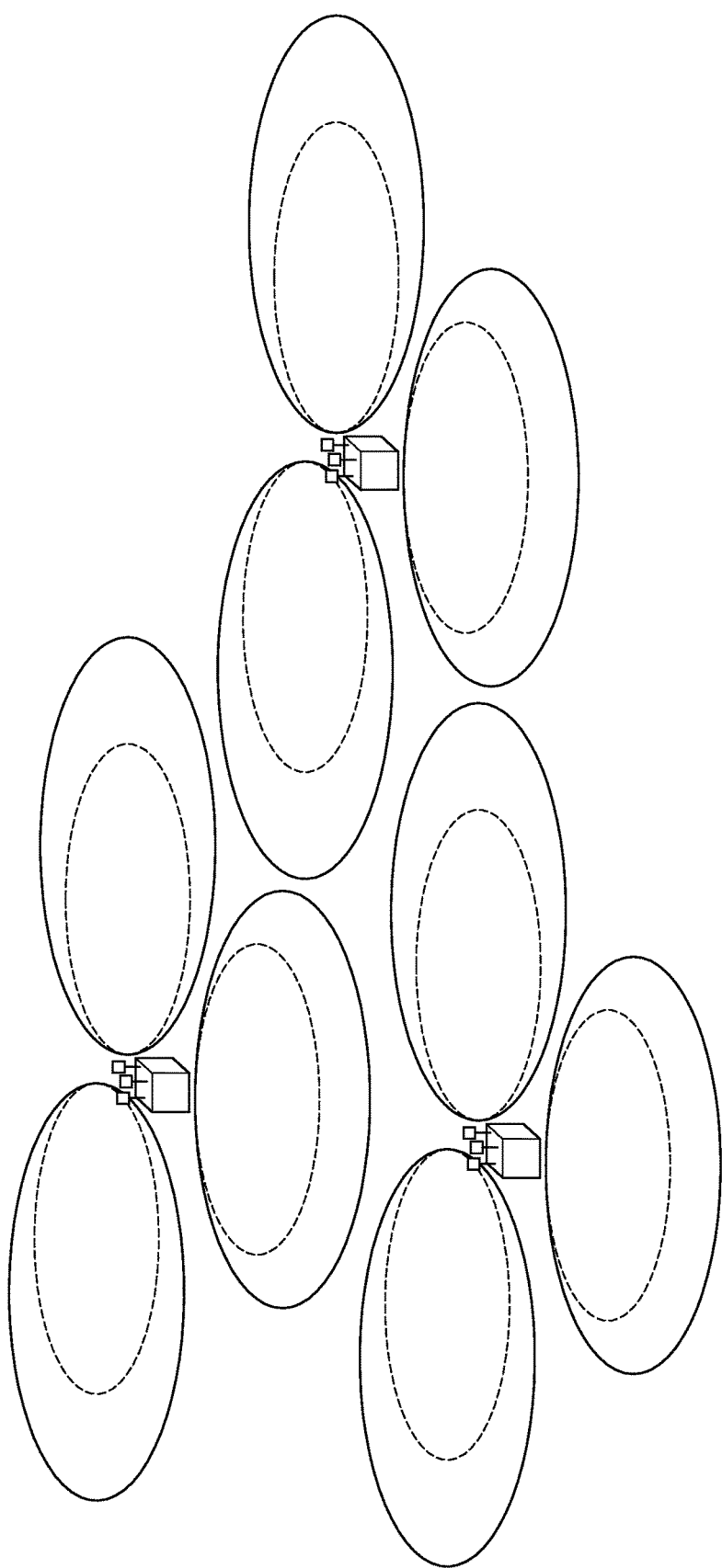
FIG. 9 shows another example of a potential deployment scenario for CA.

FIG. 9 shows another example of a potential deployment scenario for CA. F1 and F2 cells are co-located and overlaid, but F2 has smaller coverage due to larger path loss. Only F1 provides sufficient coverage and F2 is used to improve throughput. Mobility is performed based on F1 coverage. Likely scenario when F1 and F2 are of different bands, e.g., F1={800 MHz, 2 GHz} and F2={3.5 GHz}, etc. It is expected that aggregation is possible between overlaid F1 and F2 cells.

Figure 10:
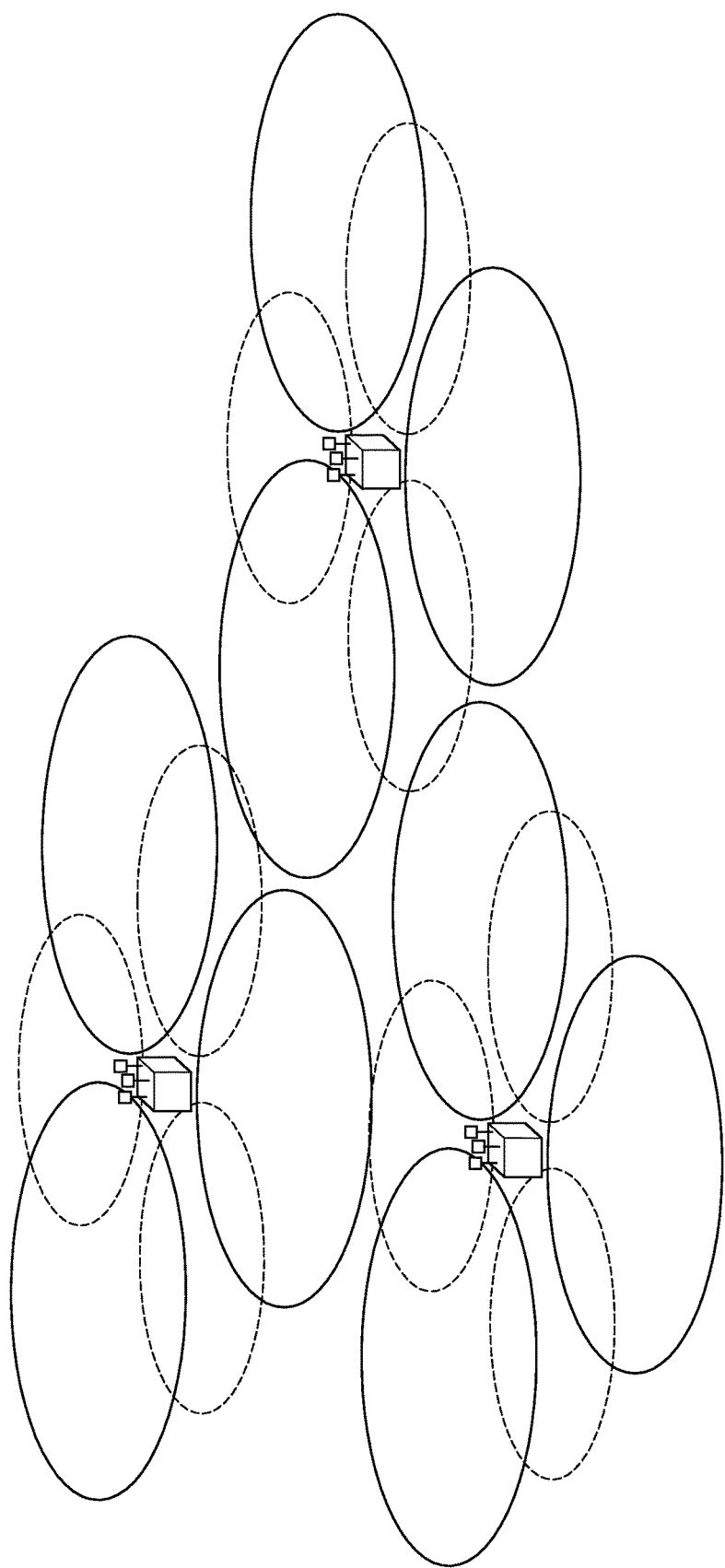
FIG. 10 shows another example of a potential deployment scenario for CA.

FIG. 10 shows another example of a potential deployment scenario for CA. F1 and F2 cells are co-located but F2 antennas are directed to the cell boundaries of F1 so that cell edge throughput is increased. F1 provides sufficient coverage but F2 potentially has holes, e.g., due to larger path loss. Mobility is based on F1 coverage. Likely scenario is when F1 and F2 are of different bands, e.g., F1={800 MHz, 2 GHz} and F2={3.5 GHz}, etc. It is expected that F1 and F2 cells of the same eNB can be aggregated where coverage overlaps.

Figure 11:
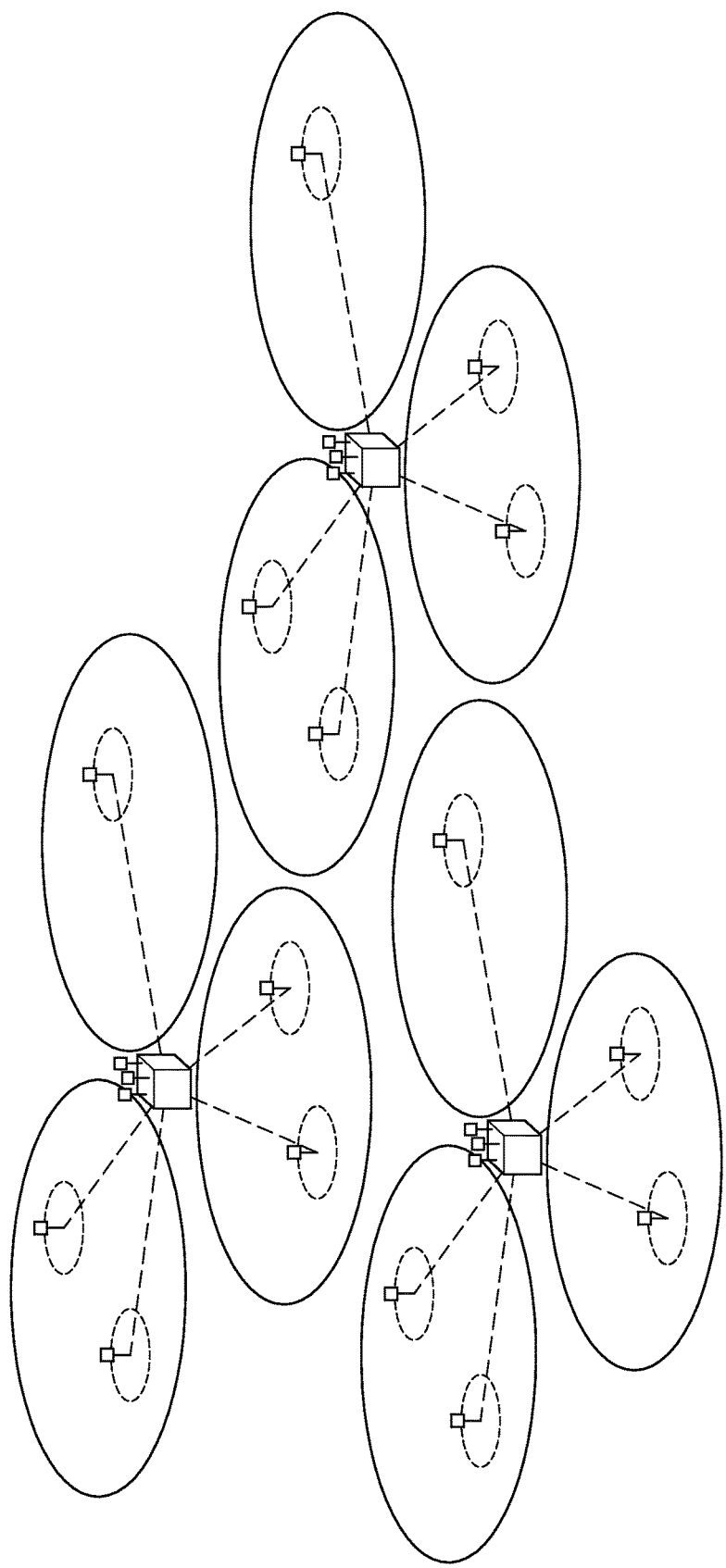
FIG. 11 shows another example of a potential deployment scenario for CA.

FIG. 11 shows another example of a potential deployment scenario for CA. F1 provides macro coverage and on F2 remote radio heads (RRHs) are used to improve throughput at hot spots. Mobility is performed based on F1 coverage. Likely scenario is when F1 and F2 are of different bands, e.g., F1={800 MHz, 2 GHz} and F2={3.5 GHz}, etc. It is expected that F2 RRHs cells can be aggregated with the underlying F1 macro cells.

Figure 12:
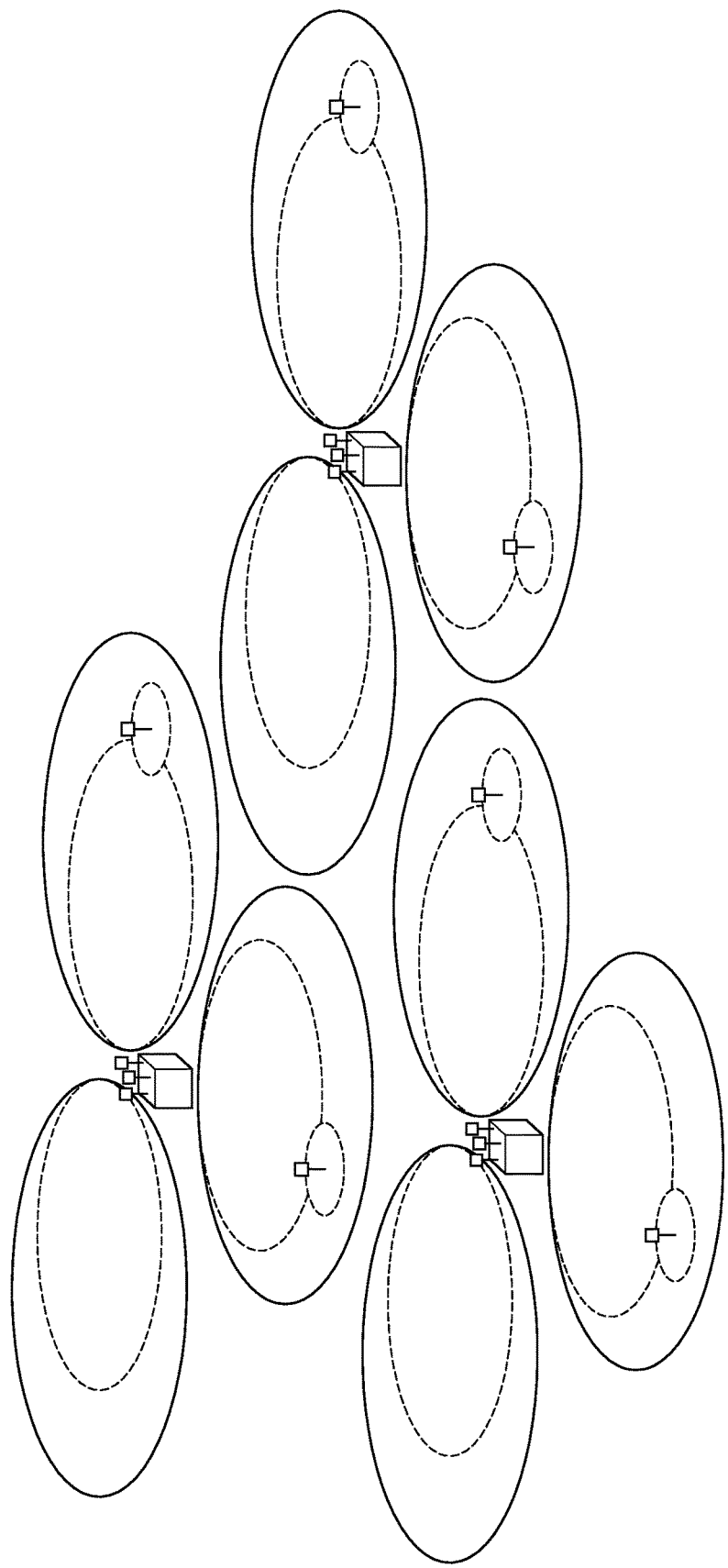
FIG. 12 shows another example of a potential deployment scenario for CA.

FIG. 12 shows another example of a potential deployment scenario for CA. It is similar to the scenario described in FIG. 9, but frequency selective repeaters are deployed so that coverage is extended for one of the carrier frequencies. It is expected that F1 and F2 cells of the same eNB can be aggregated where coverage overlaps.

Activation/deactivation of SCells is described. It may be referred to Section 5.13 of 3GPP TS 36.321 V11.1.0 (December 2012).

If the UE is configured with one or more SCells, the network may activate and deactivate the configured SCells. The PCell is always activated. The network activates and deactivates the SCell(s) by sending the activation/deactivation MAC control element. Furthermore, the UE maintains a sCellDeactivationTimer timer per configured SCell and deactivates the associated SCell upon its expiry. The same initial timer value applies to each instance of the sCellDeactivationTimer and it is configured by RRC. The configured SCells are initially deactivated upon addition and after a handover.

The UE shall for each TTI and for each configured SCell:
1> if the UE receives an Activation/Deactivation MAC control element in this TTI activating the SCell, the UE shall in the TTI according to the timing:
2> activate the SCell; i.e., apply normal SCell operation including:
3> SRS transmissions on the SCell;
3> CQI/PMI/RI/PTI reporting for the SCell;
3> PDCCH monitoring on the SCell;
3> PDCCH monitoring for the SCell
2> start or restart the sCellDeactivationTimer associated with the SCell;
1> else, if the UE receives an Activation/Deactivation MAC control element in this TTI deactivating the SCell; or
1> if the sCellDeactivationTimer associated with the activated SCell expires in this TTI:
2> in the TTI according to the timing:
3> deactivate the SCell;
3> stop the sCellDeactivationTimer associated with the SCell;
3> flush all HARQ buffers associated with the SCell.
1> if PDCCH on the activated SCell indicates an uplink grant or downlink assignment; or
1> if PDCCH on the Serving Cell scheduling the activated SCell indicates an uplink grant or a downlink assignment for the activated SCell:
2> restart the sCellDeactivationTimer associated with the SCell;
1> if the SCell is deactivated:
2> not transmit SRS on the SCell;
2> not report CQI/PMI/RI/PTI for the SCell;
2> not transmit on UL-SCH on the SCell;
2> not transmit on RACH on the SCell;
2> not monitor the PDCCH on the SCell;
2> not monitor the PDCCH for the SCell.

When SCell is deactivated, the ongoing random access procedure on the SCell, if any, is aborted.

The activation/deactivation MAC control element is identified by a MAC PDU subheader with logical channel ID (LCID). It has a fixed size and consists of a single octet containing seven C-fields and one R-field. The activation/deactivation MAC control element is defined as follows.

$C_i$: if there is a SCell configured with SCellIndex i, this field indicates the activation/deactivation status of the SCell with SCellIndex i, else the UE shall ignore the $C_i$ field. The $C_i$ field is set to "1" to indicate that the SCell with SCellIndex i shall be activated. The $C_i$ field is set to "0" to indicate that the SCell with SCellIndex i shall be deactivated;

R: Reserved bit, set to "0".

An RRC connection reconfiguration is described. It may be referred to Section 5.3.5 of 3GPP TS 36.331 V11.2.0 (December 2012).

FIG. 13 shows an RRC connection reconfiguration procedure. The purpose of the RRC connection reconfiguration is to modify an RRC connection, e.g., to establish/modify/release RBs, to perform handover, to setup/modify/release measurements, to add/modify/release SCells. As part of the procedure, NAS dedicated information may be transferred from E-UTRAN to the UE.

FIG. 13-(a) shows a successful RRC connection reconfiguration procedure. In step S50, the E-UTRAN transmits the RRCConnectionReconfiguration message. In step S51, the UE transmits the RRCConnectionReconfigurationComplete message.

FIG. 13-(b) shows a failed RRC connection reconfiguration procedure. In step S60, the E-UTRAN transmits the RRCConnectionReconfiguration message. In step S61, the UE and E-UTRAN performs an RRC connection re-establishment procedure.

E-UTRAN may initiate the RRC connection reconfiguration procedure to a UE in RRC_CONNECTED. E-UTRAN applies the procedure as follows:

the mobilityControlInfo is included only when AS-security has been activated, and SRB2 with at least one DRB are setup and not suspended;]
the establishment of RBs (other than SRB1, that is established during RRC connection establishment) is included only when AS security has been activated;
the addition of SCells is performed only when AS security has been activated;

If the RRCConnectionReconfiguration message does not include the mobilityControlInfo and the UE is able to comply with the configuration included in this message, the UE shall:

1> if this is the first RRCConnectionReconfiguration message after successful completion of the RRC Connection Re-establishment procedure:
2> re-establish PDCP for SRB2 and for all DRBs that are established, if any;
2> re-establish RLC for SRB2 and for all DRBs that are established, if any;
2> if the RRCConnectionReconfiguration message includes the fullConfig:
3> perform the radio configuration procedure;
2> if the RRCConnectionReconfiguration message includes the radioResourceConfigDedicated:
3> perform the radio resource configuration procedure;
2> resume SRB2 and all DRBs that are suspended, if any;
1> else:
2> if the RRCConnectionReconfiguration message includes the radioResourceConfigDedicated:
3> perform the radio resource configuration procedure;
1> if the received RRCConnectionReconfiguration includes the sCellToReleaseList:
2> perform SCell release;
1> if the received RRCConnectionReconfiguration includes the sCellToAddModList:
2> perform SCell addition or modification;
1> if the RRCConnectionReconfiguration message includes the dedicatedInfoNASList:
2> forward each element of the dedicatedInfoNASList to upper layers in the same order as listed;
1> if the RRCConnectionReconfiguration message includes the measConfig:
2> perform the measurement configuration procedure;
1> perform the measurement identity autonomous removal;
1> if the RRCConnectionReconfiguration message includes the reportProximityConfig:
2> perform the proximity indication in accordance with the received reportProximityConfig;
1> submit the RRCConnectionReconfigurationComplete message to lower layers for transmission using the new configuration, upon which the procedure ends;

If the RRCConnectionReconfiguration message includes the mobilityControlInfo and the UE is able to comply with the configuration included in this message, the UE shall:

1> stop timer T310, if running;
1> start timer T304 with the timer value set to t304, as included in the mobilityControlInfo;
1> if the carrierFreq is included:
2> consider the target PCell to be one on the frequency indicated by the carrierFreq with a physical cell identity indicated by the targetPhysCellId;
1> else:
2> consider the target PCell to be one on the frequency of the source PCell with a physical cell identity indicated by the targetPhysCellId;
1> start synchronising to the DL of the target PCell;
1> reset MAC;
1> re-establish PDCP for all RBs that are established;
1> re-establish RLC for all RBs that are established;
1> configure lower layers to consider the SCell(s), if configured, to be in deactivated state;
1> apply the value of the newUE-Identity as the C-RNTI;
1> if the RRCConnectionReconfiguration message includes the fullConfig:
2> perform the radio configuration procedure;
1> configure lower layers in accordance with the received radioResourceConfigCommon;
1> configure lower layers in accordance with any additional fields, not covered in the previous, if included in the received mobilityControlInfo;
1> if the RRCConnectionReconfiguration message includes the radioResourceConfigDedicated:
2> perform the radio resource configuration procedure;
1> if the keyChangeIndicator received in the securityConfigHO is set to TRUE:
2> update the $K_{eNB}$ key based on the fresh $K_{ASME}$ key taken into use with the previous successful NAS SMC procedure;
1> else:
2> update the $K_{eNB}$ key based on the current $K_{eNB}$ or the NH, using the nextHopChainingCount value indicated in the securityConfigHO;
1> store the nextHopChainingCount value;
1> if the securityAlgorithmConfig is included in the securityConfigHO:
2> derive the $K_{RRCint}$ key associated with the integrityProtAlgorithm;

2> if connected as an RN:
3> derive the $K_{UPint}$ key associated with the integrityProtAlgorithm;
2> derive the $K_{RRCenc}$ key and the $K_{UPenc}$ key associated with the cipheringAlgorithm;
1> else:
2> derive the $K_{RRCint}$ key associated with the current integrity algorithm;
2> if connected as an RN:
3> derive the $K_{UPint}$ key associated with the current integrity algorithm;
2> derive the $K_{RRCenc}$ key and the $K_{UPenc}$ key associated with the current ciphering algorithm;
1> configure lower layers to apply the integrity protection algorithm and the $K_{RRCint}$ key, i.e. the integrity protection configuration shall be applied to all subsequent messages received and sent by the UE, including the message used to indicate the successful completion of the procedure;
1> configure lower layers to apply the ciphering algorithm, the $K_{RRCenc}$ key and the $K_{UPenc}$ key, i.e. the ciphering configuration shall be applied to all subsequent messages received and sent by the UE, including the message used to indicate the successful completion of the procedure;
1> if connected as an RN:
2> configure lower layers to apply the integrity protection algorithm and the $K_{UPint}$ key, for current or subsequently established DRBs that are configured to apply integrity protection, if any;
1> if the received RRCConnectionReconfiguration includes the sCellToReleaseList:
2> perform SCell release;
1> if the received RRCConnectionReconfiguration includes the sCellToAddModList:
2> perform SCell addition or modification;
1> perform the measurement related actions;
1> if the RRCConnectionReconfiguration message includes the measConfig:
2> perform the measurement configuration procedure;
1> perform the measurement identity autonomous removal;
1> release reportProximityConfig and clear any associated proximity status reporting timer;
1> if the RRCConnectionReconfiguration message includes the reportProximityConfig:
2> perform the proximity indication in accordance with the received reportProximityConfig;
1> set the content of RRCConnectionReconfigurationComplete message as follows:
2> if the UE has radio link failure or handover failure information available in VarRLF-Report and plmn-Identity stored in VarRLF-Report is equal to the RPLMN:
3> include rlf-InfoAvadable;
2> if the UE has logged measurements available for E-UTRA and plmn-Identity stored in VarLogMeasReport is equal to the RPLMN:
3> include the logMeasAvailable;
1> submit the RRCConnectionReconfigurationComplete message to lower layers for transmission;
1> if MAC successfully completes the random access procedure:
2> stop timer T304;
2> apply the parts of the CQI reporting configuration, the scheduling request configuration and the sounding RS configuration that do not require the UE to know the SFN of the target PCell, if any;
2> apply the parts of the measurement and the radio resource configuration that require the UE to know the SFN of the target PCell (e.g. measurement gaps, periodic CQI reporting, scheduling request configuration, sounding RS configuration), if any, upon acquiring the SFN of the target PCell;
2> the procedure ends;

SCell addition/modification is described. It may be referred to Section 5.3.10.3b of 3GPP TS 36.331 V11.2.0 (December 2012). The UE shall:
1> for each sCellIndex value included in the sCellToAddModList that is not part of the current UE configuration (SCell addition):
2> add the SCell, corresponding to the cellIdentification, in accordance with the received radioResourceConfigCommonSCell and radioResourceConfigDedicatedSCell;
2> configure lower layers to consider the SCell to be in deactivated state;
1> for each sCellIndex value included in the sCellToAddModList that is part of the current UE configuration (SCell modification):
2> modify the SCell configuration in accordance with the received radioResourceConfigDedicatedSCell;

Small cell enhancement is described. It may be referred to 3GPP TR 36.932 V12.0.0 (December 2012).

Figure 14:
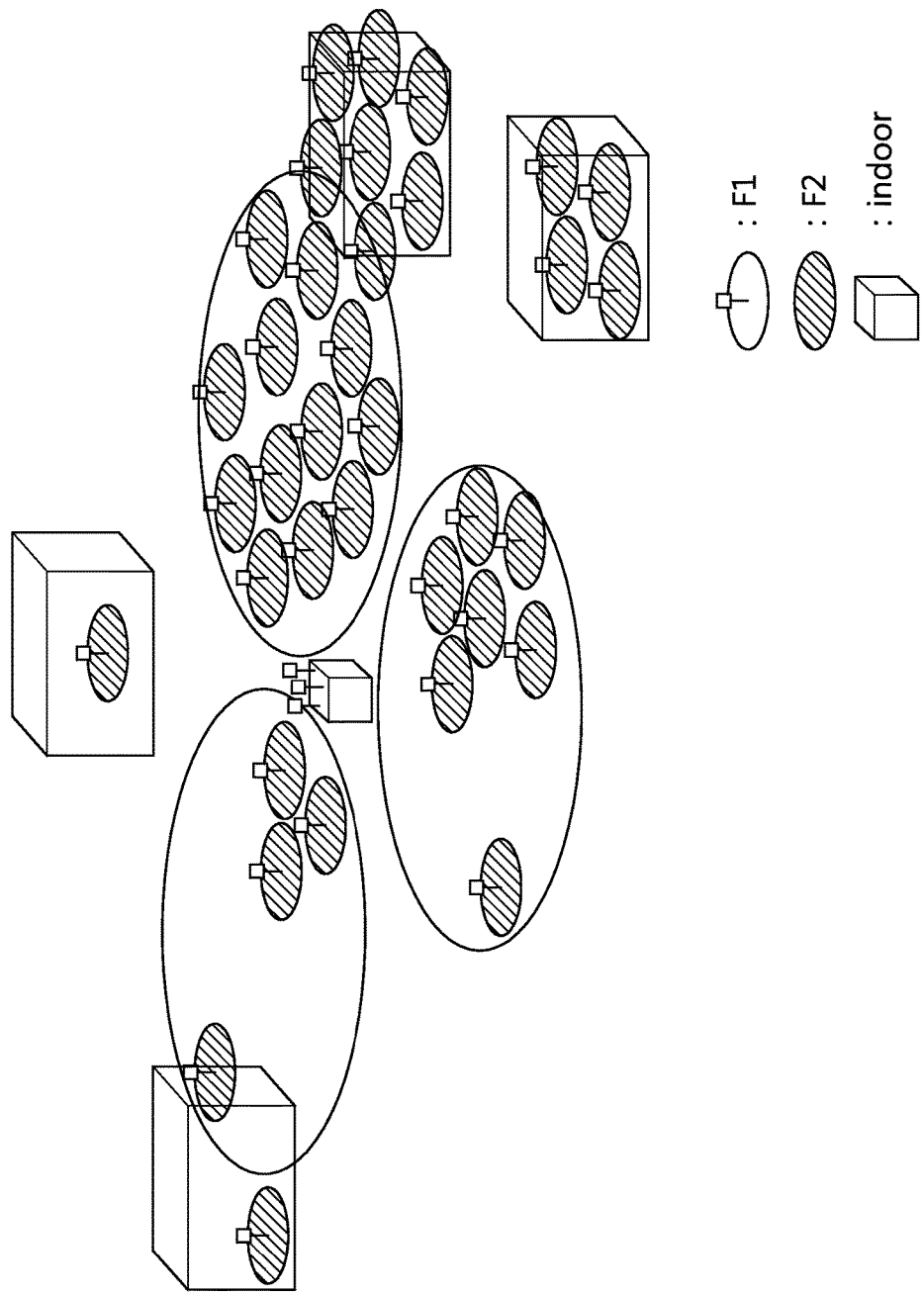
FIG. 14 shows deployment scenarios of small cells with/without macro coverage.

FIG. 14 shows deployment scenarios of small cells with/without macro coverage. Small cell enhancement should target both with and without macro coverage, both outdoor and indoor small cell deployments and both ideal and non-ideal backhaul. Both sparse and dense small cell deployments should be considered.

Referring to FIG. 14, small cell enhancement should target the deployment scenario in which small cell nodes are deployed under the coverage of one or more than one overlaid E-UTRAN macro-cell layer(s) in order to boost the capacity of already deployed cellular network. Two scenarios can be considered:
  where the UE is in coverage of both the macro cell and the small cell simultaneously
  where the UE is not in coverage of both the macro cell and the small cell simultaneously.

Also, the deployment scenario where small cell nodes are not deployed under the coverage of one or more overlaid E-UTRAN macro-cell layer(s) may be considered.

Figure 15:
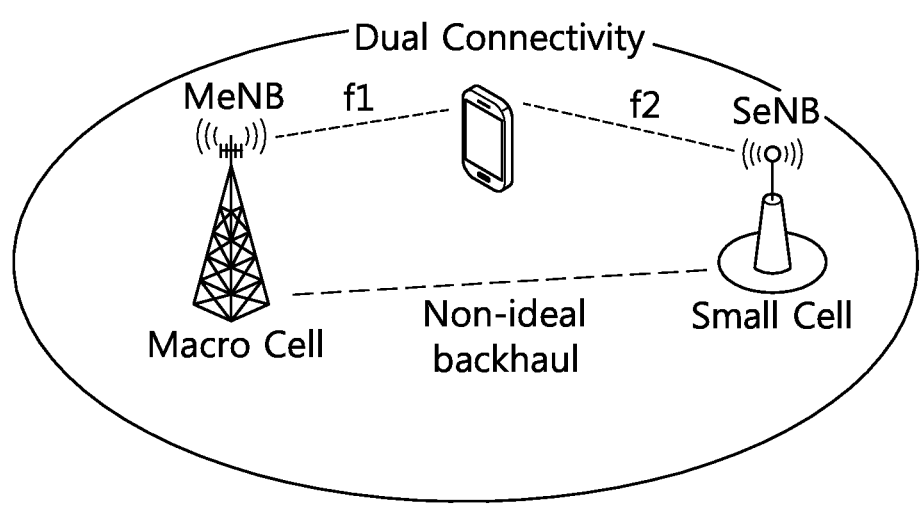
FIG. 15 shows an example of dual connectivity to a macro cell and small cell.

FIG. 15 shows an example of dual connectivity to a macro cell and small cell.

Referring to FIG. 15, an MeNB stands for a master eNB (or, a macro cell eNB), and an SeNB stands for a secondary eNB (or, a small cell eNB). The UE has a connection with the MeNB in frequency f1. In dual connectivity, the MeNB controls the macro cell, and is the eNB which terminates at least S1-MME and therefore act as mobility anchor towards the CN. Also, the UE has a connection with the SeNB in frequency f2. In dual connectivity, the SeNB controls one or more small cells, and is the eNB providing additional radio resources for the UE, which is not the MeNB. Accordingly, the UE may receive control signaling from the MeNB, and may receive data from the SeNB. The interface between the MeNB and SeNB is called an Xn interface. The Xn interface is assumed to be non-ideal backhaul. For example, delay in the Xn interface could be up to 60 ms.

Figure 16:
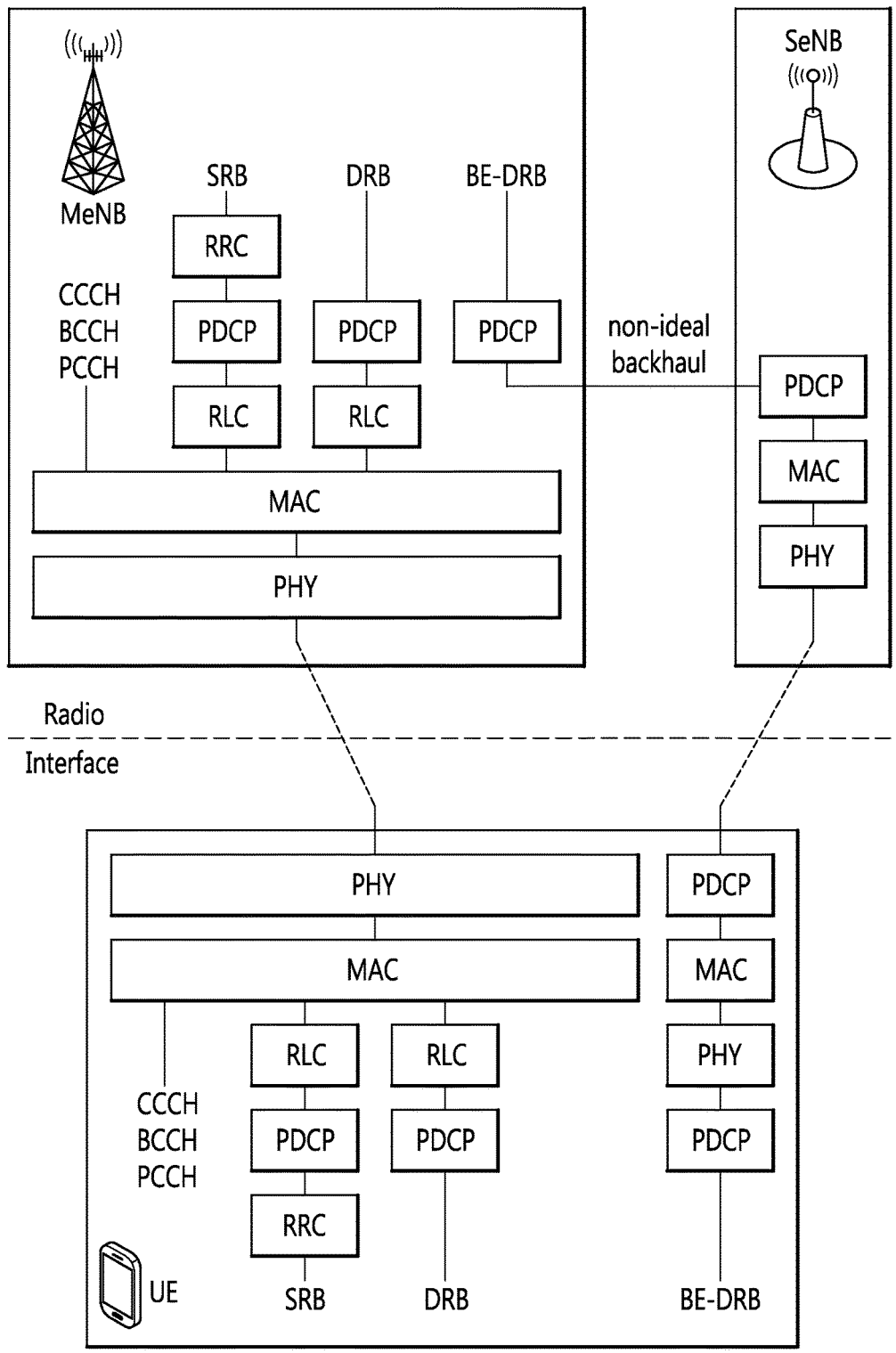
FIG. 16 shows an example of protocol architecture supporting dual connectivity.

FIG. 16 shows an example of protocol architecture supporting dual connectivity.

Referring to FIG. 16, the SeNB is responsible for transmitting best effort (BE) type traffic, while the MeNB is responsible for transmitting other types of traffic such as voice over VoIP, streaming data, or signaling data. That is, the SeNB is responsible for transmitting BE-DRBs, and the MeNB is responsible for transmitting other RB, such as SRBs and other DRBs. In the architecture described in FIG. 16, PDCP and RLC entities are located in different network nodes. That is, the PDCP entity is located in the MeNB and the RLC entity is located in the SeNB. In the UE side, the protocol architecture is same as prior art except that the MAC entity is setup for each eNB (i.e., MeNB and SeNB). Meanwhile, the protocol architecture described in FIG. 16 is just an example, and various protocol architectures may be used.

Conventionally, when the UE is configured with a new SCell by an RRC connection reconfiguration message, since the initial state of a SCell is defined as deactivated state, the UE shall considers the new SCell to be in deactivated state. Consequently, for use of the SCell, the eNB transmits a SCell activation/deactivation command indicating activation for the SCell to the UE. Upon receiving the SCell activation/deactivation command, the UE activates the SCell. The SCell is available for communication between the UE and eNB after SCell activation is performed.

However, always putting the added SCell in deactivated state may not be optimal because of following reasons:
- If the eNB intends to add the SCell so that it can use the SCell immediately, the additional step for activating the SCell causes delay.
- There is no means to use the SCell unless SCell activation/deactivation is implemented in the eNB and UE. For example, the SCell activation/deactivation command is a mandatory feature that should be supported in the eNB and UE. Therefore, it increases cost.

To solve the problem described above, a method for indicating an initial state of a SCell, and configuring the SCell based on the initial state of the SCell according to an embodiment of the present invention is described. According to an embodiment of the present invention, when a SCell is added, an indication is used to indicate an initial state of the SCell. The initial state of the SCell may be either an activated state or deactivated state. When the SCell is added or modified by an RRC connection reconfiguration message, the eNB transmits the indication to the UE.

The indication may be defined per UE or per cell. If the indication is defined per UE, the initial state of the SCell indicated by the indication may be applied to all SCells. For example, if the indication indicates that the initial state of the SCell is the activated state, the initial state of SCells following the indication is set to the activated state. That is, if the initial state of the SCell is set to the activated state by the indication, when the SCells are added, the UE considers the SCells to be in the activated state.

If the indication is defined per cell, the initial state of the SCell indicated by the indication may be applied only to the associated SCell. Therefore, the indication should be indicated for each SCell. For example, when two SCells (A and B) are added, if the indication for the SCell A indicates the initial state of the SCell A is the activated state and the indication for the SCell B indicates that the initial state of the SCell B is the deactivate state, the UE consider the SCell A to be in the activated state and the SCell B to be in the deactivated state.

The indication may be indicated to the UE explicitly or implicitly. If the explicit indication is used, the indication may include information on whether the initial state of the SCell is the activate state or the deactivate state. If the implicit indication is used, the indication may include only information that the initial state of the SCell is the activation state. That is, when the eNB wants the deactivate state as the initial state of the SCell, the eNB may not transmit the indication to the UE. So, because the indication is not explicitly indicated to the UE, the UE assumes that the initial state of the SCell is the deactivated state.

Further, the indication may change the state of the SCell currently configured to the UE. If the UE receives the indication from the eNB that the initial state is the deactivated state for the SCell already configured to the UE, and currently, the state of the SCell is the activated state, the UE may deactivate the SCell and performs corresponding operations for the deactivated SCell. If the indication is defined per UE, when the UE receives the indication that the state of the SCell is the deactivated state, the UE may deactivate all SCells.

Figure 17:
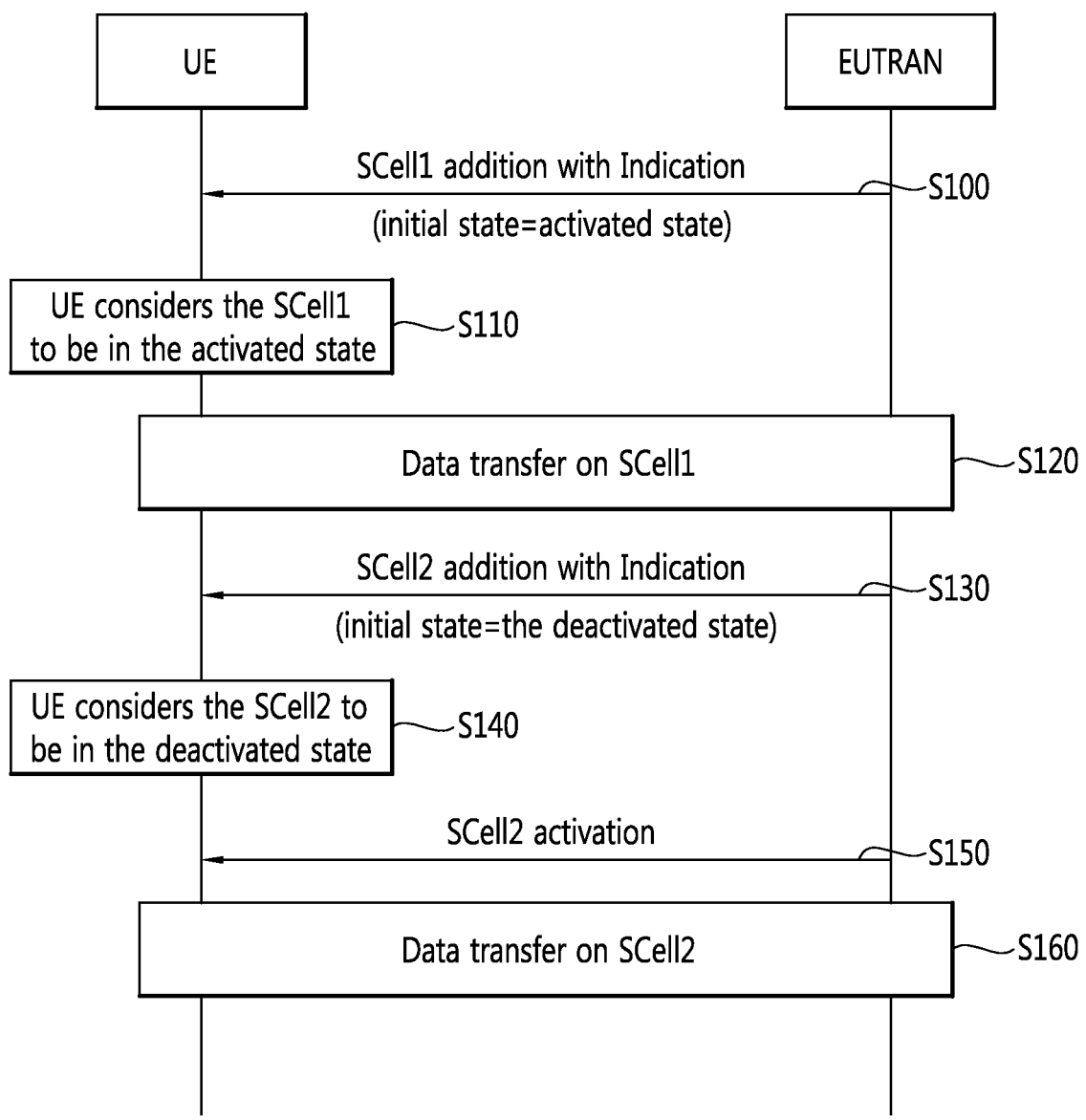
FIG. 17 shows an example of a SCell addition with an indication of an initial state according to an embodiment of the present invention.

FIG. 17 shows an example of a SCell addition with an indication of an initial state according to an embodiment of the present invention.

In step S100, the UE is configured with a SCell 1. Also, the UE receives an indication of an initial state of the SCell 1. In this example, it is assumed that the initial state of the SCell 1 is the activated state.

In step S110, upon receiving the indication of the initial state of the SCell 1, the UE consider the SCell 1 to be in the activated state.

In step S120, therefore, the UE can receive/transmit data on the SCell 1 without an additional SCell activation command.

In step S130, the UE is further configured with a SCell 2. The UE receives an indication of an initial state of the SCell 2 as well. In this example, it is assumed that the initial state of the SCell 2 is the deactivated state.

In step S140, upon receiving the indication of the initial state of the SCell 2, the UE consider the SCell 2 to be in the deactivated state.

In step S150, the UE receives a SCell 2 activation command. Upon receiving the SCell 2 activation command, then the UE activates SCell 2.

In step S160, the UE can now receive/transmit data on the SCell 2.

Figure 18:
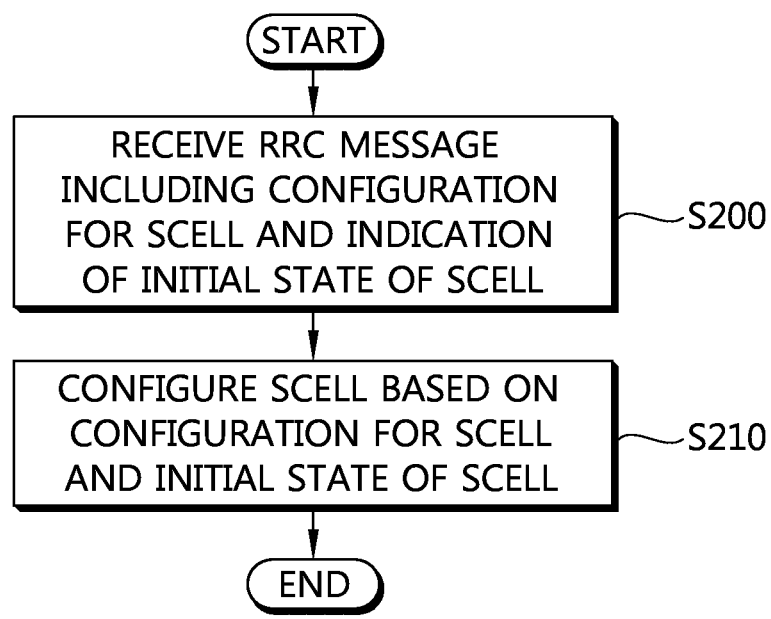
FIG. 18 shows an example of a method for configuring a SCell according to an embodiment of the present invention.

FIG. 18 shows an example of a method for configuring a SCell according to an embodiment of the present invention.

In step S200, the UE receives an RRC message which includes a configuration for a SCell and an indication of an initial state of the SCell. The initial state of the SCell is set to either one of an activated state and deactivated state. The indication may be received via an RRC connection reconfiguration message. The indication may be defined per UE or per cell.

In step S210, the UE configures the SCell based on the configuration and the initial state of the SCell. If the initial state of the SCell is set to the activated state, the UE may transmit or receive data on the SCell without an additional activation command. If the initial state of the SCell is set to the deactivated state, the UE may receive an activation command for the SCell, and may activate the SCell according to the activation command.

Figure 19:
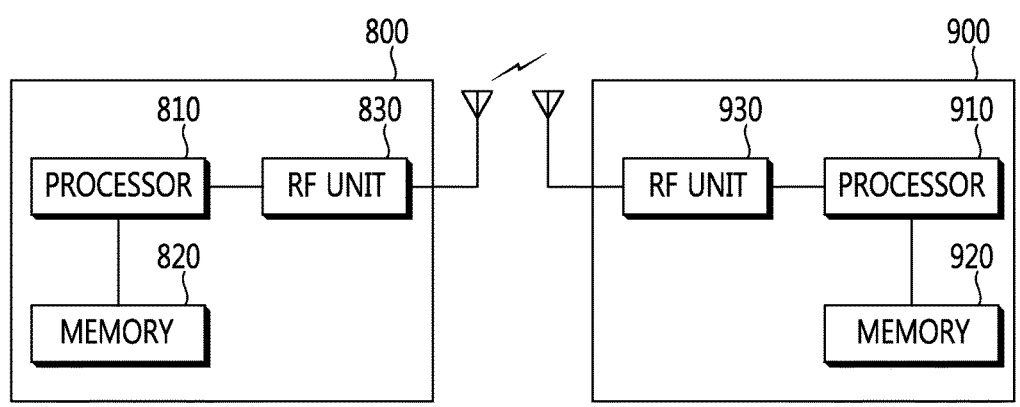
FIG. 19 shows a wireless communication system to implement an embodiment of the present invention.

FIG. 19 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for configuring, by a user equipment (UE), a cell in a wireless communication system, the method comprising:
    receiving a radio resource control (RRC) connection reconfiguration message, from a primary cell (PCell), which includes a configuration for a new secondary cell (SCell) and an indication indicating that an initial state of the new SCell is set to either an activated state or a deactivated state;
    configuring the new SCell based on the received configuration for the new SCell;
    determining whether the initial state of the new SCell is set to the activated state or the deactivated state, based on the received indication; and if the received indication indicates that the initial state of the new SCell is set to the deactivated state,
    receiving an activation command for the new SCell;
    activating the new SCell according to the activation command;
    transmitting or receiving data on the new SCell after activating the new SCell, and if the received indication indicates that the initial state of the new SCell is set to the activated state,
    transmitting or receiving data on the new SCell without receiving any activation command for the new SCell.

2. The method of claim 1, wherein the received indication is defined per UE or per cell.

3. A user equipment (UE) in a wireless communication system, the UE comprising:
    a radio frequency (RF) unit that transmits and receives a radio signal; and
    a processor, coupled to the RF unit, that:
    controls the RF unit to receive a radio resource control (RRC) connection reconfiguration message, from a primary cell (PCell), which includes a configuration for a new secondary cell (SCell) and an indication indicating that an initial state of the new SCell is set to either an activated state or a deactivated state;
    configures the new SCell based on the received configuration for the new SCell;
    determines whether the initial state of the new SCell is set to the activated state or the deactivated state, based on the received indication; and if the received indication indicates that the initial state of the new SCell is set to the deactivated state, the processor further:
    controls the RF unit to receive an activation command for the new SCell;
    activates the new SCell according to the activation command;
    controls the RF unit to transmit or receive data on the new SCell after activating the new SCell, and if the received indication indicates that the initial state of the new SCell is set to the activated state, the processor further:
    controls the RF unit to transmit or receive data on the new SCell without receiving any activation command for the new SCell.

4. The UE of claim 3, wherein the received indication is defined per UE or per cell.

5. The method of claim 2, wherein when the received indication is per UE, the initial state of the SCell indicated by the received indication applies to all new SCells added by the UE.

6. The method of claim 2, wherein when the received indication is per cell, the initial state of the SCell indicated by the received indication applies only to the new SCell.

7. The UE of claim 4, wherein when the received indication is per UE, the initial state of the SCell indicated by the received indication applies to all new SCells added by the UE.

8. The UE of claim 4, wherein when the received indication is per cell, the initial state of the SCell indicated by the received indication applies only to the new SCell.

* * * * *